UNITED STATES PATENT OFFICE.

EUGENE KLEIN, OF GRAND RAPIDS, MICHIGAN, ASSIGNOR TO PAULINE KLEIN, OF SAME PLACE.

COMPOSITION FOR IMPREGNATING WOOD AND FIBER.

SPECIFICATION forming part of Letters Patent No. 605,060, dated May 31, 1898.

Application filed April 26, 1897. Serial No. 634,015. (No specimens.)

*To all whom it may concern:*

Be it known that I, EUGENE KLEIN, a citizen of the United States, residing at Grand Rapids, in the county of Kent and State of Michigan, have invented a new and useful Composition of Matter for the Treatment of Wood and Fiber Jelly-Pails, of which the following is a specification.

My invention relates to a composition with which to treat wood and fiber jelly-pails to render them impervious to the fruit acids and to the effect of heat when storing or pouring the hot jelly into the pails.

My composition consists of the following ingredients combined in the proportions stated, viz: gum-amber, twenty pounds; caustic soda, twelve pounds; hydrated lime, eighteen pounds; water, quantities to moisten one ton of fiber-pulp; prepared, mixed, and properly tempered to treat fiber and wood when both are embodied in a jelly-pail or other receptacle designed to resist the influence of the hot jelly when being poured into the receptacle.

In the finished pail the tempering or solvent portion of my compound evaporates or is taken up by the wood or fiber, and the gum-amber is left as a hard insoluble coating on the surface, with a heat resistance of nearly 600° Fahrenheit before it reaches the melting-point, which renders it absolutely proof against even softening at the ordinary temperature of the fruit jellies when boiling and absolutely proof against the fruit acids, no matter what the conditions may be.

Having thus fully described my compound and in what manner it is to be applied, what I claim as new, and desire to secure by Letters Patent of the United States, is—

The herein-described composition of matter consisting of gum-amber, with soda, lime, and water, substantially as and for the purpose set forth.

Signed at Grand Rapids, Michigan, this 24th day of April, 1897.

EUGENE KLEIN.

In presence of—
ANDREW ALLGIER,
I. J. CILLEY.